United States Patent [19]
Pranger et al.

[11] Patent Number: 5,428,369
[45] Date of Patent: Jun. 27, 1995

[54] COMPUTER POINTING DEVICE

[75] Inventors: Maarten R. Pranger, Morgan Hill; Cristian A. Fraenkel, San Mateo; Richard Pekelney, San Francisco; David C. Shafer, Menlo Park, all of Calif.

[73] Assignee: Kensington Microware Limited, San Mateo, Calif.

[21] Appl. No.: 255,320

[22] Filed: Jun. 7, 1994

[51] Int. Cl.⁶ .............................. G09G 5/08
[52] U.S. Cl. .................... 345/166; 345/163; 345/167
[58] Field of Search ............... 345/163–167, 345/172, 156–158, 161, 162

[56] References Cited

U.S. PATENT DOCUMENTS 5,119,077 6/1992 Giorgio ................... 345/163

Primary Examiner—Jeffery Brier
Attorney, Agent, or Firm—Townsend and Townsend Khourie and Crew

[57] ABSTRACT

The present invention provides for an improved computer pointing device such as a trackball or mouse, for example. The improved computer pointing device allows a user to set a communications protocol for use with a particular computer system by using a user-friendly configuration program designed for operation on a different platform and by using a different communications protocol. Additionally, the computer pointing device includes an LED encoder illumination control system to provide varying levels of LED intensities. During normal operation, an LED operates at a particular intensity level. The intensity level is controllable in discrete steps: LED power is off for power up, LED power is reduced for testing to test for unacceptable signal levels, and LED power may be increased beyond normal levels to counteract diminution of light intensity as the LED ages.

12 Claims, 3 Drawing Sheets

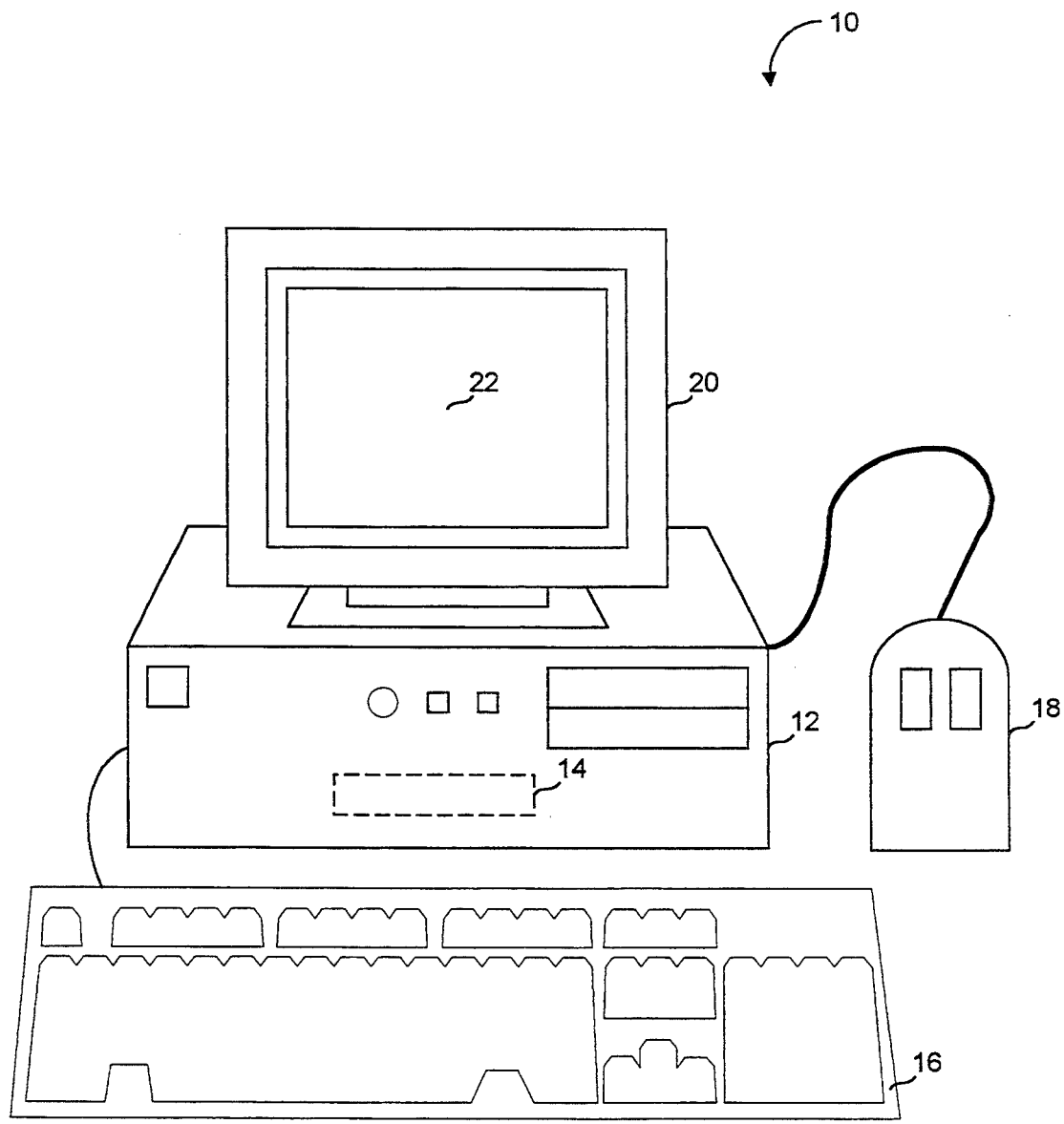
FIG_1

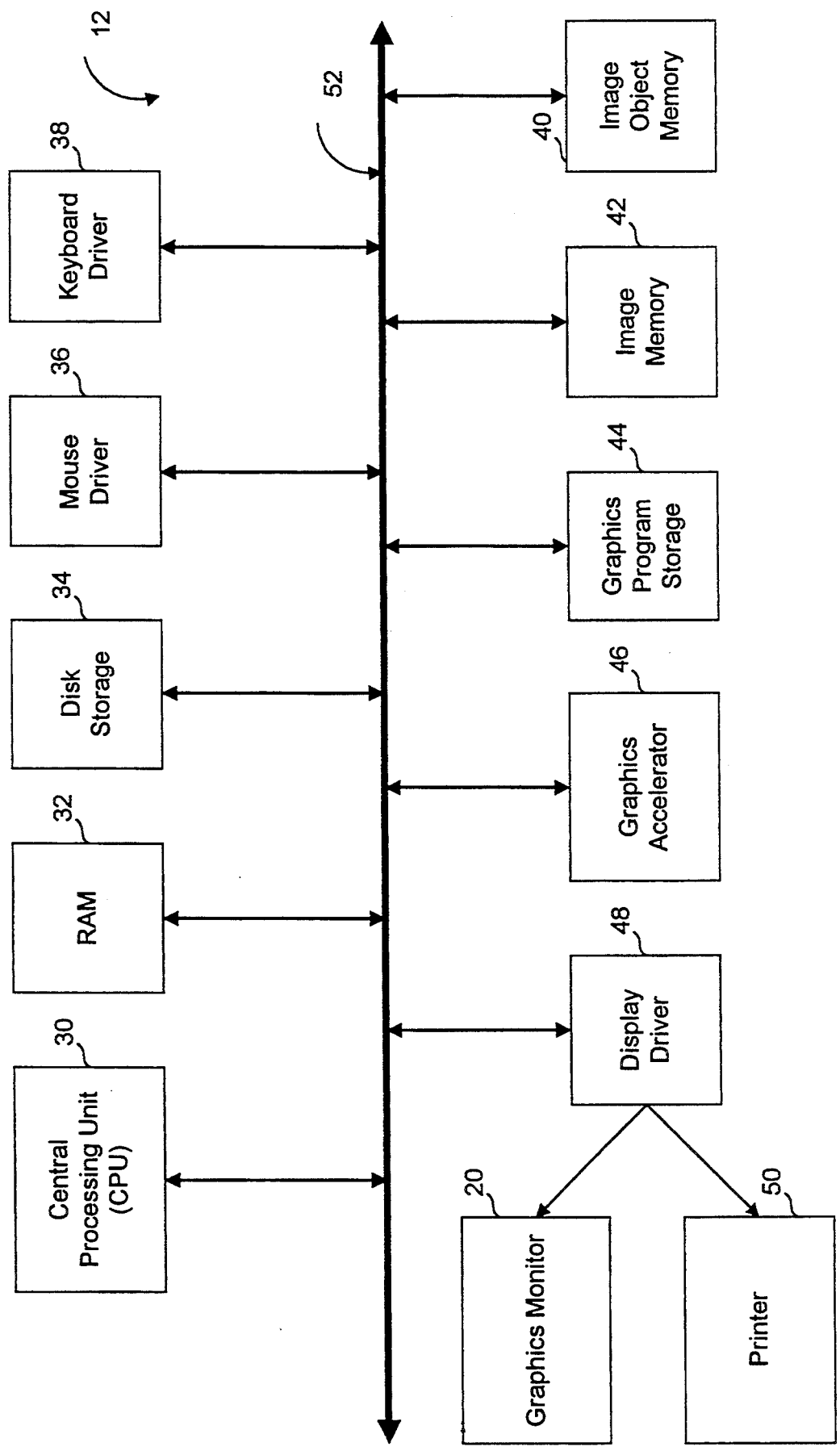
FIG_2

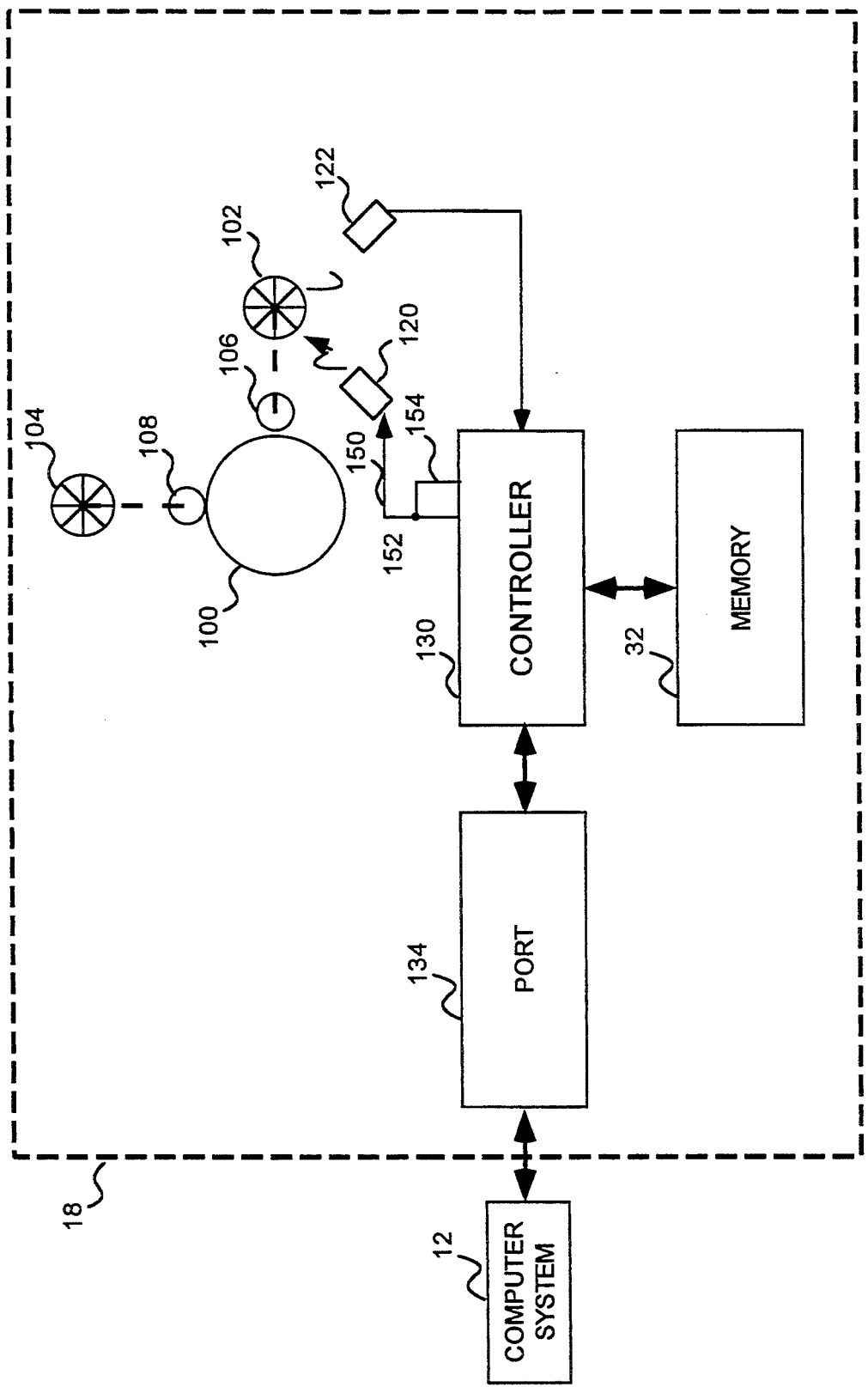
FIG_3

COMPUTER POINTING DEVICE

BACKGROUND OF THE INVENTION

The present invention relates generally to computer pointing devices, and more specifically, to computer pointing devices that are capable of communicating using several different types of protocols or to those that use light-emitting diodes to generate positional information.

As graphical user interfaces (GUIs) for personal computers gain in popularity, use of associated computer pointing devices likewise increases. Computer pointing devices must use a particular communications protocol to communicate with its associated personal computer system. There are several communications protocols available. The use of any particular one depends upon the type of personal computer attached to the computer pointing device. For example, for IBM personal computers and compatibles, computer pointing devices commonly use an "M" protocol, developed by Microsoft Corporation of Redmond, Wash. or an "M+" protocol developed by Logitech of Fremont, Calif., or a "5-byte" protocol associated with Mouse Systems of Fremont, Calif. It is common for workstations using the UNIX operating system to communicate with pointing devices using the "5-byte" protocol. These protocols are applicable to asynchronous communications using an RS-232 compliant interface.

It is known to provide computer pointing devices with multiple protocols. Conventional computer pointing devices often use hardware switches or jumpers to set the desired communications protocol. Use of switches and jumpers is undesirable for several reasons. Providing switches and jumpers requires user access. The switches and jumpers are accessed through an aperture in a housing of the computer pointing device, or the pointing device includes features to allow a user to open the pointing device to make desired settings. Both of these solutions are undesirable from a manufacturing cost and a maintenance perspective. The addition of an aperture in a housing increases the manufacturing cost of a computer pointing device. Also, the more apertures that there are in a computer pointing device, the greater the exposure the internal components have to the environment, potentially decreasing the component reliability and decreasing the mean time between failures (MTBF).

Switches and jumpers are undesirable for another reason that relates to selection of proper settings by the user. It is often difficult for a user to determine the proper switch or jumper settings to achieve the desired configuration. Improper switch or jumper settings can result in improper operation, or nonoperability, of the computer pointing device.

It is also known to use software-controlled configuration options in computer pointing devices. A user selects a desired protocol from the available options by operating a configuration program. Proper attention to user-interface issues when designing the configuration program tremendously simplifies issuing commands to the computer pointing device over an asynchronous communications port.

There are drawbacks to the prior art configuration programs and computer pointing devices. In order to operate conventional configuration programs, the manufacturer must offer the computer program for the particular computer system using the computer pointing device. For platforms such as the widespread IBM PC-compatible system, many publishers compile their programs to operate on the platform in well-known fashion. For less popular platforms, suitable configuration programs are not as readily available. For computer pointing device configuration programs, it is particularly important to have a program designed for the particular platform that is issuing the configuration commands to the computer pointing device. One reason that this is true is because configuration programs interface to the computer hardware at a basic level. Specific commands to access and set values of particular registers are often necessary.

Another reason to have a platform-specific configuration program is that the configuration program often uses infrequently used commands in order to configure the pointing device, or to configure the communications port to allow the configuration program to issue commands to the computer pointing device. Computer pointing devices generally send signals to the associated computer. Sometimes the communications port through which the computer pointing device communicates to the associated computer is only a one-way channel. Such systems are incapable of issuing commands to the computer pointing device. Conventional configuration programs are useless if the associated computer cannot execute the configuration program or if the associated computer cannot issue commands to the computer pointing device.

Many conventional computer pointing devices use encoder wheels to translate movement of the pointing device into digital positioning signals for use by the computer system. There are at least two different types of encoder wheels: those that include periodic apertures and those with alternating dark and light radial stripes. In either case, an LED illuminates the encoder wheel and a suitably-positioned detector monitors the change in light intensity due to rotation of the wheel.

For apertured encoder wheels, positioning the detector on a side opposite from the LED provides "ON" and "OFF" signals according to movement of the computer pointing device. For striped encoder wheels, positioning the detector on the same side of the wheel as the LED provides a pulsating "HIGH" and "LOW" signal as light from the LED is more or less strongly reflected from the surface of the encoder wheel.

There are various advantages and disadvantages with each type of encoder. For the striped encoder wheel, it is important to maximize LED illumination intensity to permit error-free discrimination of the HIGH and LOW signals. As the illumination intensity falls, discrimination of the HIGH and LOW signals is more difficult. LED illumination invariably declines over the useful life of the computer pointing device. Slight misalignments in the optical path of the LED, encoder wheel and detector can introduce errors in translating the positioning signals as the illumination intensity decreases. It is difficult to detect these types of minor misalignments, or similar problems, with quality control checks and acceptance testing because the LED for each encoder is at its maximum intensity for a particular input current level.

SUMMARY OF THE INVENTION

The present invention provides apparatus and method for an improved computer pointing device such as a trackball or mouse, for example. The improved computer pointing device allows a user to set a communications protocol for use with a particular computer system by using a user-friendly configuration program designed for operation on a different platform and by using a different communications protocol.

Additionally, the computer pointing device includes an LED encoder illumination control system to provide varying levels of LED intensities. During normal operation, an LED operates at a particular intensity level. The intensity level is controllable in discrete steps: LED power is off for power up, LED power is reduced for testing to test for unacceptable signal levels, and LED power may be increased beyond normal levels to counteract diminution of light intensity as the LED ages.

According to one aspect of the invention, it includes a position translating unit and a non-volatile memory. The position translating unit alternately operates using a first communications protocol and a second communications protocol selected from a plurality of protocols available to the computer pointing device. A particular one of the protocols is selected responsive to a value stored in a configuration bit of the non-volatile memory. The value of the configuration bit is selected by a computer system coupled to the computer pointing device.

In operation, a user preferably connects the computer pointing device to a widely available personal computer, such as to an IBM PC-compatible system. The computer pointing device and the personal computer communicate with each other using a first protocol appropriate for the particular computer. The user operates a configuration program to set a configuration bit in the non-volatile memory of the computer pointing device to cause the pointing device to use a second communications protocol. The user thereafter connects the reconfigured computer pointing device to a computer system that uses the second communications protocol.

According to another aspect of the invention, the computer pointing device includes an LED encoder illumination control system. The control system includes an LED responsive to two different current levels to produce two discrete intensity levels, and a current generator coupled to the LED. The current generator is responsive to a configuration bit to drive the LED at a normal operating level, as well as at a reduced intensity level.

In operation, the configuration memory is set to cause the current generator to drive the LED at the reduced intensity level for testing purposes. If the signal-to-noise level is acceptable for the reduced intensity level, the computer pointing device will operate more reliably at the normal operating intensity level.

According to still another aspect of the invention, the computer pointing device includes a controller to turn off current to the LED during power up or following a system reset. It may be advantageous to turn off the LEDs for other reasons. For example, turning off the LEDs prior to writing to a non-volatile memory such as an EEPROM provides additional power needed for writing data. The power off feature is also applicable to power saving features useful to portable computers, for example.

According to yet another aspect of the invention, the LED of the computer pointing device is operable at a third intensity level that is brighter than the normal operating intensity level. This third intensity level is available to compensate for loss in LED intensity at the second current level due to aging.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawing. In the drawing, like reference numbers indicate identical or functionally similar elements.

BRIEF DESCRIPTION OF THE DRAWINGS

FIG. 1 is an illustration of a workstation in which an embodiment of the present invention is implemented, including a computer and peripherals;

FIG. 2 is a block diagram of the computer shown in FIG. 1, including storage for a configuration program; and FIG. 3 is a block schematic diagram of a computer-pointing device including a preferred embodiment of the present invention.

DESCRIPTION OF THE PREFERRED EMBODIMENT

FIG. 1 is an illustration of a workstation 10, which includes a computer system 12 coupled to a fixed disk 14, a keyboard 16, a relative-pointing device (RPD) 18, and a monitor 20. Monitor 20 is shown with a display surface 22. The examples that follow refer to an image being displayed on display surface 22 of monitor 20 from a collection of object descriptions stored on fixed disk 14, however the invention is equally applicable to variations such as where the display device is a printer and the display surface is a printed page, or the display device is some other pixelated display device. The source of the object descriptions also need not be disk 14, but could be RPD 18, such as a trackball or mouse, for example, keyboard 16, or some other input mechanism not shown, or a combination of the above.

FIG. 2 is a block diagram of computer system 12. Computer system 12 includes a central processing unit (CPU) 30, random access memory (RAM) 32, a disk 34, an RPD driver 36, a keyboard driver 38, an image object memory 40, and image memory 42, a program memory 44, an optional graphics accelerator 46, and a display driver 48, all coupled by a computer bus 52. Display driver 48 is shown coupled to monitor 20 and a printer 50. In variations of computer system 12, one or more elements might be combined. For example image memory 42 might be a part of RAM 32, or RPD driver 36 and keyboard driver might be combined.

CPU 30 is used to process instructions of a program to generate an image, and possibly other computing tasks. Typically, CPU 30 controls the interaction of the items coupled to bus 52. For example, CPU 30 uses RAM 32 to store variables and data arrays used in processing, disk 34 as a non-volatile memory to store instructions of the program should power be removed, RPD driver 36 to receive input from RPD 18, and keyboard driver 38 to receive input from keyboard 16.

In a data processing operation, CPU 30 first moves the program to more accessible program storage 44, and moves a collection of object descriptions into image object memory 40. Running the program causes CPU 30 to read descriptions of objects from image object memory 40 to generate an image, which is then stored in image memory 42. The processing can either be done all by CPU 30, or some operations might be passed to graphics accelerator 46 for faster processing. Once the image is generated, it can be moved from image memory 42 to display driver 48, which outputs it to one or more display devices.

Image object memory 40 is different from image memory 42, in that image object memory 40 stores descriptions of objects and image memory 42 stores pixels of the image of the objects. For example, for an image of a red sphere illuminated by a white light in front of a blue background, image object memory 40 would store the location in world coordinates of the center of the sphere, its radius, a value representing the color red, the location in world coordinates of the light, a viewpoint, a view opening, and the color of the background. By contrast, image memory 42 contains, after processing, a two-dimensional array corresponding to the two-dimensional array of pixels which make up display surface 22. In image memory 42, one color value is stored for each pixel, most likely color values for reds and blues depending on the location of the pixel on display surface 22. The color values, when displayed, form an image of the red sphere and the blue background.

In a preferred embodiment, the details of the operation of computer system 12 needed to generate an image in memory 42 from object descriptions in object memory 40 are determined by the program stored in storage 44.

FIG. 3 is a block schematic diagram of a computer-pointing device (RPD 18) including a preferred embodiment of the present invention. RPD 18 includes a ball 100 mechanically coupled to two encoder wheels (encoder wheel 102 and encoder wheel 104) by contact rollers (contact roller 106 and contact roller 108, respectively). Encoder wheel 102 and encoder wheel 104 having alternating dark and light radial stripes. RPD 18 includes an encoder illumination assembly having a light-emitting diode (LED 120) and a detector 122. The encoder illumination assembly is positioned so that LED 120 illuminates one of the encoder wheels (encoder wheel 102 in FIG. 3) and detector 122 receives light reflected from the illuminated encoder wheel. A similar encoder illumination assembly is provided, but not shown, for encoder wheel 104.

RPD 18 includes a controller 130, a non-volatile memory 132, and a communications port 134, with communications port 134 coupled to computer system 12. In the preferred embodiment, non-volatile memory 132 is an electrically-erasable programmable read-only memory (EEPROM), but other types of non-volatile memory could be substituted. Controller 130 is coupled to the encoder illumination assembly, memory 132 and port 134. Controller 130 provides drive current to LED 120 and receives signals from detector 122. Controller 130 stores and retrieves configuration data by using memory 132.

Controller 130 communicates with computer system 12 using port 134. Controller 130 is able to use many different communications protocols to communicate with computer system 12. Configuration data identifying the particular communications protocol is received by controller 130 through port 134 from computer system 12 and written to memory 132. Thereafter, controller 130 will use the communications protocol identified by the configuration data written to memory 132. In the preferred embodiment, the particular communications protocol is selected at power-up or reset. In other embodiments, it is possible to immediately change the communications protocol dynamically when reconfigured, if desired.

Controller 130 is able to provide discrete drive currents to LED 120 in order to provide different illumination levels. In the preferred embodiment, controller 130 provides four different current levels: off, low, medium and high. As the current level increases, the illumination intensity increases as well.

In the preferred embodiment, controller 130 provides LED drive current via line 150. To achieve the four discrete drive levels, two drive lines (line 152 and line 154) are coupled together. Each of line 152 and line 154 provides a different current level, the combination thus providing four discrete drive levels.

In operation according to the preferred embodiment, a widely-available type of computer system 12 executes a configuration program to send configuration data to controller 130. Configuration data includes the type of communications protocol to use at power up, and the intensity level of LED 120.

Setting the communications protocol in this fashion permits a manufacturer of such configurable computer pointing devices as described herein to publish configuration programs for widely-available platforms, and still permit the use of the computer pointing device on less-widely available computer platforms, without publishing configuration programs for every platform for which the computer pointing device is operable. To return the pointing device to its default state (wherein the pointing device uses a communication protocol for the widely-available computer system 12) the preferred embodiment uses activation of two switches during power-up to signal default modes.

For the multi-power level LED aspect of the preferred embodiment, the configuration data relating to LED intensity provides a number of advantages. Controller 130 will delay powering up LED 120 (i.e., LED 120 will be off) in response to a power up or reset of computer system 12 to reduce the power requirements of RPD 18, and the resulting drain on computer system 12. Thereafter, controller 130 will drive LED 120 at the intensity level selected by configuration data stored in memory 132.

Controller 130 selects the middle current intensity level as the default intensity level for LED 120. This middle intensity is the normal operating level. There are occasions when it is desirable to alter the intensity level. One occasion is right after manufacture and prior to shipment to a consumer. For post-manufacturing acceptance testing or other quality assurance testing, a manufacturer configures RPD 18 so that controller 130 drives LED 120 at the low intensity level. The manufacture conducts testing at the reduced intensity level in order to detect problems that would not appear in normal operation but that could manifest themselves later, such as when LED 120 ages and the illumination output at the default drive level decreases. Testing at the reduced LED intensity level provides for a more reliable device, resulting in prolonged use for the consumer. It is not necessary to store this type of configuration change in a non-volatile memory.

Another occasion for which it is desirable to change the intensity level is after prolonged use of the pointing device. After prolonged use, the light intensity of LED 120 at the normal current level is reduced. In order to ensure sufficient signal-to-noise ratios for the reflected light received by detector 122, a user reconfigures RPD 18 to use the high current level. The high current level improves performance and reliability of RPD 18 after performance degradation of LED 120.

For still another occasion for which it is desirable to reduce LED current levels, is when programming the non-volatile memory. As well known, when writing to a non-volatile memory such as an EEPROM, greater power requirements exist than when reading the device. Therefore, by turning the LED off prior to programming the EEPROM, better results are obtained.

In conclusion, the present invention provides a simple, efficient solution to a problem of configuring computer pointing devices, and to improve computer pointing device performance and reliability. While the above is a complete description of the preferred embodiments of the invention, various alternatives, modifications, and equivalents may be used.

For example, other configuration options, other than a desired communications protocol, are optionally configured and stored in the non-volatile memory. These options may include: switch configuration for left or right-handed operation, chording and chording time, reporting rate, baud rate, echo and scaling, for example. For certain operations, it may not be necessary to store LED power level configuration data in non-volatile memory. For example, for the testing mode, it may be desirable to temporarily command the low power state. Therefore, the above description should not be taken as limiting the scope of the invention which is defined by the appended claims.

What is claimed is:

1. A computer pointing device, comprising:
   a position translating unit, alternately operable in a first communications protocol and a second communications protocol, wherein said position translating unit is responsive to a configuration bit to select a particular one of said communications protocols; and
   a non-volatile memory, coupled to said position translating unit within a housing of said position translating unit and responsive to a configuration signal from an associated computer system, for storing said configuration bit to indicate said particular one communications protocol for said position translating unit.

2. The computer pointing device of claim 1 wherein said non-volatile memory is an electrically-erasable programmable read-only memory.

3. The computer pointing device of claim 1 wherein said associated computer system is an IBM PC-compatible system.

4. The computer pointing device of claim 1 wherein said first communications protocol is adapted for operation with an IBM PC-compatible system and said second communications protocol is adapted for operation with a computer system that cannot use said first communications protocol.

5. A method for setting, using a first computer system, a communications protocol for a computer pointing device for operation on a second computer system, comprising the steps of:
   coupling the computer pointing device to the first computer system;
   operating a configuration program operable on the first computer system but not on the second computer system to configure a non-volatile memory within the computer pointing device, said configuration program communicating to the computer pointing device using a first communications protocol appropriate for the first computer system but incompatible with a second communications protocol appropriate for the second computer system;
   using said configuration program to configure said non-volatile memory to operate the computer pointing device using said second communications protocol;
   decoupling the computer pointing device from the first computer system; and
   coupling the computer pointing device to the second computer system to communicate cursor positioning signals from the computer pointing device to the second computer system using said second communications protocol.

6. An LED encoder illumination control system for a computer pointing device, comprising:
   a light-emitting diode responsive to a first current level to generate light at a first intensity level, and responsive to a second current level to generate light at a second light intensity level brighter than said first intensity level; and
   a current source, coupled to said light emitting diode and responsive to a configuration bit in a memory, for alternately providing said first current level and providing said second current level depending upon a value of said configuration bit.

7. The LED encoder illumination control system of claim 6 wherein said memory is a non-volatile memory in the computer pointing device.

8. The LED encoder illumination control system of claim 7 wherein said current source provides a third current level and said light-emitting diode is responsive to said third current level, to generate a third intensity level brighter than said second intensity level.

9. The LED encoder illumination control system of claim 6 wherein said second intensity level illuminates an encoder wheel of the computer pointing device for normal operation, said control system further comprising:
   a tester, adapted to be coupled to said memory, for setting said configuration bit to cause said current generator to generate said first current level during testing of the computer pointing device.

10. The LED encoder illumination control system of claim 8 further comprising:
    a computer system, coupled to the computer pointing device, for executing a configuration program adapted to set said configuration memory to cause said current source to provide said third current level.

11. The LED encoder illumination control system of claim 10 further comprising:
    a controller, coupled to said current source, for disabling current provision during power-up procedures of said computer system.

12. A method for testing a computer pointing device, comprising the steps of:
    operating a light-emitting diode for an encoder assembly to generate light at a normal operating intensity level;
    setting a configuration memory of the computer pointing device to reduce current to said light-emitting diode to generate light at a testing intensity level that is less than said normal operating intensity level;
    performing manufacturing acceptance testing for the computer pointing device while said light-emitting diode emits light at said testing intensity level; and
    resetting said configuration memory to operate said light-emitting diode at said normal operating intensity level.

* * * * *